(12) United States Patent
Weaver et al.

(10) Patent No.: US 8,136,593 B2
(45) Date of Patent: Mar. 20, 2012

(54) METHODS FOR MAINTAINING CONDUCTIVITY OF PROPPANT PACK

(75) Inventors: Jimmie D Weaver, Duncan, OK (US); Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 83 days.

(21) Appl. No.: 12/537,860

(22) Filed: Aug. 7, 2009

(65) Prior Publication Data

US 2011/0030949 A1 Feb. 10, 2011

(51) Int. Cl.
 *E21B 33/13* (2006.01)
(52) U.S. Cl. ............ 166/292; 166/295; 166/280.1; 166/305.1
(58) Field of Classification Search .......... None
See application file for complete search history.

(56) References Cited

U.S. PATENT DOCUMENTS

| | | | |
|---|---|---|---|
| 4,585,064 A | 4/1986 | Graham et al. | |
| 4,670,501 A | 6/1987 | Dymond et al. | |
| 5,249,627 A | 10/1993 | Harms et al. | |
| 5,420,174 A * | 5/1995 | Dewprashad | 523/130 |
| 5,833,000 A | 11/1998 | Weaver et al. | |
| 5,839,510 A | 11/1998 | Weaver et al. | |
| 5,853,048 A | 12/1998 | Weaver et al. | |
| 6,047,772 A * | 4/2000 | Weaver et al. | 166/276 |
| 6,311,773 B1 | 11/2001 | Todd et al. | |
| 6,439,309 B1 | 8/2002 | Matherly et al. | |
| 6,488,091 B1 | 12/2002 | Weaver et al. | |
| 6,582,819 B2 | 6/2003 | McDaniel et al. | |
| 6,677,426 B2 | 1/2004 | Noro et al. | |
| 6,725,931 B2 * | 4/2004 | Nguyen et al. | 166/280.2 |
| 6,866,099 B2 | 3/2005 | Nguyen | |
| 6,892,813 B2 * | 5/2005 | Nguyen et al. | 166/276 |
| 7,131,491 B2 | 11/2006 | Blauch et al. | |
| 7,153,575 B2 | 12/2006 | Anderson et al. | |
| 7,237,609 B2 | 7/2007 | Nguyen | |
| 7,819,192 B2 | 10/2010 | Weaver et al. | |
| 2005/0277554 A1 | 12/2005 | Blauch et al. | |
| 2007/0289781 A1 | 12/2007 | Rickman et al. | |
| 2008/0011478 A1 * | 1/2008 | Welton et al. | 166/280.2 |
| 2011/0030950 A1 | 2/2011 | Weaver et al. | |

FOREIGN PATENT DOCUMENTS

EP 1403466 S3 3/2004

OTHER PUBLICATIONS

SandWedge® NT Conductivity Enhancement System, 2005.
SilverStimsm℠ LT Fracturing Service, 2007.
Office Action for U.S. Appl. No. 12/634,469 dated Dec. 29, 2010.
Office Action for U.S. Appl. No. 12/634,469 dated Feb. 14, 2011.

* cited by examiner

*Primary Examiner* — Angela M DiTrani
(74) *Attorney, Agent, or Firm* — Robert A. Kent; McDermott Will & Emery LLP

(57) ABSTRACT

Methods suitable for use in a subterranean formation utilizing particulates coated with both a tackifier and a resin.

16 Claims, No Drawings

METHODS FOR MAINTAINING CONDUCTIVITY OF PROPPANT PACK

BACKGROUND

The present invention relates to methods useful in treating subterranean formations. More particularly, the present invention relates to methods of coating particulates that may be used in subterranean operations with a resin and a tackifier.

Often subterranean formations are subjected to treatments that insert particulates at or near a production zone. One such treatment is hydraulic fracturing. In hydraulic fracturing treatments, a viscous fracturing fluid, which also functions as a carrier fluid, is pumped into a producing zone to be fractured at a rate and pressure such that one or more fractures are formed in the zone. Particulate solids commonly referred to in the art as "proppant," are commonly suspended in a portion of the fracturing fluid so that the proppant is deposited in the fractures. The proppant deposited in the fractures functions to prevent the fractures from fully closing so that conductive channels are formed through which produced hydrocarbons may flow. Generally, the force of the formation bearing down on the proppant acts to keep the proppant in place. However, it is often the case that not all of the proppant will be effectively trapped by the pressure of the formation. For instance, some proppant particulates may break free of the proppant pack with the force of the produced fluids, or some portion of the proppant particulates may crush under the pressure of the formation and create unconsolidated particulates.

Gravel packs may also act to add particulates into a portion of a subterranean formation. A "gravel pack" is a term commonly used to refer to a volume of particulate materials (such as sand) placed into a well bore to at least partially reduce the migration of unconsolidated formation particulates into the well bore. Gravel packing operations commonly involve placing a gravel pack screen in the well bore neighboring a desired portion of the subterranean formation, and packing the surrounding annulus between the screen and the subterranean formation with particulate materials that are sized to prevent and inhibit the passage of formation solids through the gravel pack with produced fluids. In some instances, a screenless gravel packing operation may be performed. In either case, the resulting structure presents a barrier to migrating formation particles, and stabilizes the formation, while still permitting fluid flow. The gravel, among other things, is designed to prevent the particulates from occluding the screen or migrating with the produced fluids, and the screen acts to prevent the gravel from entering the well bore. However, it is possible for gravel to escape from the confines of the pack or for the gravel pack to bridge or otherwise fail to fully halt the flow of unconsolidated particulates into the well bore.

In some situations, hydraulic fracturing and gravel packing operations may be combined into a single treatment. Such treatments are often referred to as "frac pack" operations. In some cases, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Particulates (such as proppant or gravel) used in subterranean operations are often coated with resins to facilitate consolidation of the particulates and/or to prevent their subsequent flow-back through the conductive channels in the subterranean formation, which can, for example, clog the conductive channels and/or damage the interior of the formation or equipment. The term "resin" as used herein refers to any of numerous physically similar polymerized synthetics or chemically modified natural resins including thermoplastic materials and thermosetting materials. In addition to maintaining a relatively solids-free production stream, consolidating particulates also aids in protecting the conductivity of the formation. Flow of unconsolidated particulate material through the conductive channels in a subterranean formation may tend to clog the conductive channels and/or damage the interior of the formation or may erode downhole equipment, plug piping and vessels, and cause damage to valves, instruments and other production equipment. For these among other reasons, it is desirable to consolidate unconsolidated particulates within a producing zone in a subterranean formation.

SUMMARY

The present invention relates to methods useful in treating subterranean formations. More particularly, the present invention relates to methods of coating particulates that may be used in subterranean operations with a resin and a tackifier.

Some embodiments of the present invention describe methods comprising: providing first particulates and a liquid composition comprising a tackifying compound and a resin; coating the first particulates with the liquid composition to form coated particulates; suspending the coated particulates in a carrier fluid; and placing the carrier fluid comprising first coated particulates into a portion of a subterranean formation.

Other embodiments of the present invention describe methods comprising: providing particulates, a tackifying compound, and a resin; coating the particulates with the tackifying compound to form tackifying compound-coated particulates; coating the tackifying compound-coated particulates with the resin to form twice-coated particulates; suspending the twice-coated particulates in a carrier fluid; and, placing the carrier fluid into a portion of a subterranean formation.

Still other embodiments of the present invention describe methods comprising: providing a plurality of particulates, a tackifying compound, and a resin; coating the particulates with the tackifying compound to form tackifying compound-coated particulates; suspending the tackifying compound-coated particulates in a carrier fluid wherein the carrier fluid comprises the resin; and, placing the carrier fluid into a portion of a subterranean formation.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods useful in treating subterranean formations. More particularly, the present invention relates to methods of coating particulates that may be used in subterranean operations with a resin and a tackifier.

One of the many potential advantages of the methods of the present invention is that they allow for the use of only a small amount of curable resin in the preparation of coated particulates, thereby lowering costs and minimizing the amount of resin that may stick to and coat equipment used in preparing the coated particulates. Another potential advantage of the methods of the present invention is assistance in the prevention of the migration and invasion of formation fines into or through proppant packs. Another potential advantage of the methods of the present invention is in allowing for a single treatment to minimize the migration of fines within the treated portion of the formation while also providing cohesive strength and minimizing proppant flowback during production through a portion of a subterranean formation that has been treated according to the methods of the present invention. Still another potential advantage is that the cohesion strength of the resultant proppant pack may be tailored to a specific application so as to focus on reducing proppant flowback, minimizing fines migration, or both.

In accordance with some embodiments of the methods of the present invention, particulates are first at least partially coated with a mixture of a tackifying compound and a resin and then the coated particulates are suspended into a carrier fluid and placed into a desired location within a subterranean formation. In other methods of the present invention, particulates may be first coated with a tackifying compound and then coated with a resin, the twice-coated particulates are then suspended into a carrier fluid and placed into a desired location within a subterranean formation. In still other methods of the present invention, particulates may be coated with a tackifying compound and then suspended in a carrier fluid wherein the carrier fluid comprises a resin; the carrier fluid comprising the resin and the tackifying compound-coated particulates is then placed into a desired location within a subterranean formation. In each of these embodiments, the tackifying compound acts to both aid in curing the resin and assists in the attachment of the resin to the particulates as the resin is attracted to the amine sites on the tackifying compound.

Optionally, particulates coated with only a tackifying compound may be suspended in a pre-treatment fluid and then be placed into the subterranean formation before the placement of the carrier fluid (comprising some combination of tackifying compound, resin, and particulates as described above). In these optional methods, the tackifying compound is placed into the formation at a location farther from the wellbore than the particulates in the carrier fluid so that they can act as an additional barrier to fines migration.

As used herein, the term "coated" does not imply any particular degree of coverage of the particulates. The particulates may be coated by any suitable method as recognized by one skilled in the art with the benefit of this disclosure. In some preferred embodiments, the particulates are coated, on average over about 25% of their surface area; in other preferred embodiments, the particulates are coated, on average over about 50% of their surface area; and in still other preferred embodiments, the particulates are coated, on average over about 75% of their surface area. The particulates may be suspended in the carrier fluid by any suitable method as recognized by one skilled in the art with the benefit of this disclosure, including using a fracturing blender.

I. Suitable Resins

Nearly all resins known in the art that are suitable for use in subterranean operations may be used in the methods of the present invention. The term "resin" as used herein refers to any of numerous physically similar polymerized synthetics or chemically modified natural resins including thermoplastic materials and thermosetting materials.

Resins suitable for use in the present invention include all resins known in the art that are capable of forming a hardened, consolidated mass. Many such resins are commonly used in subterranean operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, water-based resins, HT epoxy-based resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

In some embodiments, the resin may be provided as an emulsion. Suitable emulsion resins include, but are not limited to, emulsified epoxide resins. In embodiments where the resin is provided as an emulsion, the emulsion may have an aqueous external phase and an internal resin phase. Examples of suitable resin emulsion compositions are described in U.S. Published Application Nos. 2007-0187097 (U.S. Pat. No. 7,819,192) and 2007-0289781, which are incorporated by reference in their entirety.

A. Two-Component Epoxy Based Resins

One resin-type coating material suitable for use in the methods of the present invention is a two-component epoxy based resin comprising a hardenable resin component and a hardening agent component. The hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include geographic location of the well and the surrounding weather conditions. An alternate way to reduce the viscosity of the hardenable resin is to heat it. This method avoids the use of a solvent altogether, which may be desirable in certain circumstances. The second component is the hardening agent component, which is comprised of a hardening agent, a organosilane coupling agent, a surfactant, an optional hydrolyzable ester for, among other things, breaking gelled fracturing fluid films on the proppant particles, and an optional carrier fluid for, among other things, reducing the viscosity of the hardening agent component. It is within the ability of one skilled in the art with the benefit of this disclosure to determine if and how much carrier fluid is needed to achieve a viscosity suitable to the subterranean conditions.

Examples of hardenable resins that can be used in the hardenable resin component include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resin, urea-aldehyde resins, furan resins, urethane resins, a glycidyl ether resins, other epoxide resins, and combinations thereof. In some embodiments, the hardenable resin may comprise a urethane resin. Examples of suitable urethane resins may comprise a polyisocyanate component and a polyhydroxy component. Examples of suitable hardenable resins that may be suitable for use in the methods of the present invention include those described in U.S. Pat. Nos. 6,582,819 issued to McDaniel, et al., 4,585,064 issued to Graham, et al., 6,677,426 issued to Noro, et al., and 7,153,575 issued to Anderson, et al., each of which are incorporated by reference herein in their entirety. The hardenable resin used is included in the hardenable resin component in an amount in the range of from about 60% to about 100% by weight of the hardenable resin component. In some embodiments the hardenable resin used is included in the hardenable resin component in an amount of about 70% to about 90% by weight of the hardenable resin component. It is within the ability of one skilled in the art with the benefit of this disclosure to determine how much of the hardenable resin component may be need to achieve the desired results. Factors that may affect this decision include which type of hardenable resin component and hardening agent component are used.

Any solvent that is compatible with the hardenable resin and achieves the desired viscosity effect is suitable for use in the hardenable resin. Some preferred solvents are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin composition chosen and is within the ability of one skilled in the art with the benefit of this disclosure.

As described above, use of a solvent in the hardenable resin component is optional but may be desirable to reduce the viscosity of the hardenable resin component for ease of handling, mixing, and transferring. It is within the ability of one skilled in the art, with the benefit of this disclosure, to determine if and how much solvent is needed to achieve a suitable viscosity. In some embodiments the amount of the solvent used in the hardenable resin component is in the range of from about 0.1% to about 30% by weight of the hardenable resin component. Optionally, the hardenable resin component may be heated to reduce its viscosity, in place of, or in addition to, using a solvent.

Examples of the hardening agents that can be used in the hardening agent component include, but are not limited to, cyclo-aliphatic amines, piperazine, derivatives of piperazine (e.g., aminoethylpiperazine), modified piperzines, aromatic amines, methylene dianiline, derivatives of methylene dianiline, hydrogenated forms of dianiline, 4,4'-diaminodiphenyl sulfone, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, ethylene diamine, diethylene triamine, triethylene tetraamine, tetraethylene pentaamine, cyclo-aliphatic amines, amides, polyamides, 2-ethyl-4-methyl imidazole, 1,1,3-trichlorotrifluoroacetone, and combinations thereof. The chosen hardening agent often effects the range of temperatures over which a hardenable resin is able to cure. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl) phenol, and 2-($N_2$N-dimethylaminomethyl)phenol are preferred with N,N-dimethylaminopyridine most preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 70° F. to as high as about 350° F.

The hardening agent may be included in the hardening agent component in an amount sufficient to at least partially resin. In some embodiments of the present invention, the hardening agent used is included in the hardenable resin component in the range of from about 0.1% to about 95% by weight of the hardening agent component. In some embodiments the hardenable resin used is included in the hardenable resin component in an amount of about 15% to about 85% by weight of the hardening agent component. In some embodiments the hardenable resin used is included in the hardenable resin component in an amount of about 15% to about 55% by weight of the hardening agent component.

Any organosilane coupling agent that is compatible with the hardenable resin and facilitates the coupling of the resin to the surface of the particulates is suitable for use in the present invention. Examples of organosilane coupling agents include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes, aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; and gamma-glycidoxypropyltrimethoxysilanes; vinyltrichlorosilane; vinyltris(beta-methoxyethoxy)silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-β(aminoethyl)-r-aminopropyl-trimethoxysilane; N-beta (aminoethyl)-r-aminopropylmethyldimethoxysilane; 3-aminopropyl-triethoxysilane; N-phenyl-r-aminopropyltrimethoxysilane; r-mercaptopropyltrimethoxysilane; Vinyltrichlorosilane; vinyltris(β-methoxyethoxy)silane; Vinyltrimethoxysilane; r-metacryloxypropyltrimethoxysilane; beta-(3,4 epoxycyclohexyl)-ethyltrimethoxysilane; r-glycidoxypropyltrimethoxysilane;

r-glycidoxypropylmethylidiethoxysilane; N-beta(aminoethyl)-r-aminopropyltrimethoxysilane; N-beta(aminoethyl)-r-aminopropylmethyldimethoxysilane; r-aminopropyltriethoxysilane; N-phenyl-r-aminopropyltrimethoxysilane; r-mercaptopropyltrimethoxysilane; and combinations thereof. The organosilane coupling agent used is included in the hardening agent component in an amount capable of sufficiently bonding the resin to the particulate. In some embodiments of the present invention, the organosilane coupling agent used is included in the hardenable resin component in the range of from about 0.1% to about 3% by weight of the hardening agent component.

Any surfactant compatible with the hardening agent and capable of facilitating the coating of the resin onto particles in the subterranean formation may be used in the hardening agent component. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also may be suitable. Examples of such surfactant mixtures are described in U.S. Pat. No. 6,311,773 issued to Todd et al. on Nov. 6, 2001, the relevant disclosure of which is incorporated herein by reference. The surfactant or surfactants used are included in the hardening agent component in an amount in the range of from about 1% to about 10% by weight of the hardening agent component.

While not required, examples of hydrolysable esters that can be used in the hardening agent component of the integrated consolidation fluids of the present invention include, but are not limited to, a mixture of dimethylglutarate, dimethyladipate, and dimethylsuccinate; sorbitol; catechol; dimethylthiolate; methyl salicylate; dimethyl salicylate; dimethylsuccinate; tert-butylhydroperoxide; and combinations thereof. When used, a hydrolyzable ester is included in the hardening agent component in an amount in the range of from about 0.1% to about 3% by weight of the hardening agent component. In some embodiments a hydrolysable ester is included in the hardening agent component in an amount in the range of from about 1% to about 2.5% by weight of the hardening agent component.

Use of a diluent or carrier fluid in the hardenable resin composition is optional and may be used to reduce the viscosity of the hardenable resin component for ease of handling, mixing and transferring. It is within the ability of one skilled in the art, with the benefit of this disclosure, to determine if and how much carrier fluid is needed to achieve a viscosity suitable to the subterranean conditions. Any suitable carrier fluid that is compatible with the hardenable resin and achieves the desired viscosity effects is suitable for use in the present invention. Some preferred carrier fluids are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, butyl alcohol, d'limonene, fatty acid methyl esters, and combinations thereof. Other preferred carrier fluids include aqueous dissolvable solvents such as, methanol, isopropanol, butanol, glycol ether solvents, and combinations thereof. Suitable glycol ether carrier fluids include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate carrier fluid is dependent on the resin composition chosen and is within the ability of one skilled in the art with the benefit of this disclosure.

B. Furan Resins

Other resins suitable for use in the methods of the present invention are furan-based resins. Suitable furan-based resins include, but are not limited to, furfuryl alcohol resins, mixtures furfuryl alcohol resins and aldehydes, and a mixture of furan resins and phenolic resins. Of these, furfuryl alcohol resins are preferred. A furan-based resin may be combined with a solvent to control viscosity if desired. Suitable solvents for use in the furan-based consolidation fluids of the present invention include, but are not limited to isopropyl alcohol, 2-butoxy ethanol, butyl lactate, butyl acetate, tetrahydrofurfuryl methacrylate, tetrahydrofurfuryl acrylate, esters of oxalic, maleic and succinic acids, and furfuryl acetate. Of these, 2-butoxy ethanol is preferred.

Optionally, the furan-based resins suitable for use in the present invention may further comprise a curing agent to, among other things, facilitate or accelerate curing of the furan-based resin at lower temperatures. The presence of a curing agent may be particularly useful in embodiments where the furan-based resin may be placed within subterranean formations having temperatures below about 350° F. Examples of suitable curing agents include, but are not limited to, organic or inorganic acids, such as maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), and combinations thereof. In those embodiments where a curing agent is not used, the furan-based resin may cure autocatalytically.

C. Phenolic Resins

Still another resin suitable for use in the methods of the present invention is a phenolic-based resin. Suitable phenolic-based resins include, but are not limited to, terpolymers of phenol, phenolic formaldehyde resins, and a mixture of phenolic and furan resins. Of these, a mixture of phenolic and furan resins may be preferred. A phenolic-based resin may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol. Of these, 2-butoxy ethanol may be preferred.

D. High-Temperature Epoxy Resins

Another resin suitable for use in the methods of the present invention is a high temperature (HT) epoxy-based resin. Suitable HT epoxy-based components include, but are not limited to, bisphenol A-epichlorohydrin resins, polyepoxide resins, novolak resins, polyester resins, glycidyl ethers and mixtures thereof. Of these, bisphenol A-epichlorohydrin resins are preferred. An HT epoxy-based resin may be combined with a solvent to control viscosity if desired. Suitable solvents for use with the HT epoxy-based resins of the present invention are those solvents capable of substantially dissolving the HT epoxy-resin chosen for use in the consolidation fluid. Such solvents include, but are not limited to, dimethyl sulfoxide and dimethyl formamide. A co-solvent such as a dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene and fatty acid methyl esters, may also be used in combination with the solvent.

E. Phenol/Phenol Formaldehyde/Furfuryl Alcohol Resins

Yet another resin-type coating material suitable for use in the methods of the present invention is a phenol/phenol formaldehyde/furfuryl alcohol resin comprising from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant. In the phenol/ phenol formaldehyde/furfuryl alcohol resins suitable for use in the methods of the present invention, suitable organosilane coupling agents and surfactants include those listed above as suitable for use with two-component epoxy based resins.

II. Tackifying Compounds

Tackifying compounds suitable for use in the present invention include non-aqueous tackifying agents; aqueous tackifying agents; and silyl-modified polyamides. In addition to encouraging the proppant particulates to form aggregates, the use of a tackifying agent may yield a propped fracture that experiences very little or no undesirable proppant flow back. Additionally, the use of a tackifying compound may allow for the use of only a small amount of resin in the preparation of coated particulates, thereby minimizing the amount of resin sticking to and coating equipment used in preparing the coated particulates.

A person of ordinary skill in the art, with the benefit of this disclosure, would be able to determine an appropriate combination of tackifying compound and resin to be used together. When selecting a tackifying compound and a resin, care must be taken to ensure that both components have a matching functionality. For example, in certain embodiments of the present invention, when the selected resin comprises two component epoxy based resin a tackifying compound comprising an epoxy functionality may be desirable; such a combination can allow the tackifying compound to act as an activator or curing agent for the curable epoxy resin. A person of ordinary skill in the art, with the benefit of this disclosure, would be able to determinate an appropriate combination of tackifying compound and resin based on the functionality of those components.

A. Non-Aqueous Tackifying Agents

One type of tackifying agent suitable for use in the present invention is a non-aqueous tackifying agent. A particularly preferred group of tackifying agents comprises polyamides that are liquids or in solution at the temperature of the subterranean formation such that they are, by themselves, nonhardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying compounds include liquids and solutions of, for example, polyesters, polycarbonates and polycarbamates, natural resins such as shellac, and the like. In some preferred embodiments, the non-aqueous tackifying agent is a dimer acid polyamide with additional amine functionality. Other suitable non-aqueous tackifying agents are described in U.S. Pat. No. 5,853,048 issued to Weaver, et al. and U.S. Pat. No. 5,833,000 issued to Weaver, et al., the relevant disclosures of which are herein incorporated by reference.

Non-aqueous tackifying agents suitable for use in the present invention may be either used such that they form a non-hardening coating or they may be combined with a multifunctional material capable of reacting with the non-aqueous tackifying agent to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the non-aqueous tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Suitable multifunctional materials are described in U.S. Pat. No. 5,839,510 issued to Weaver, et al., the relevant disclosure of which is herein incorporated by reference.

Solvents suitable for use with the non-aqueous tackifying agents of the present invention include any solvent that is compatible with the non-aqueous tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

B. Aqueous Tackifying Agents

Aqueous tackifying agents suitable for use in the present invention are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of a particulate to prepare it to be coated with an aqueous tackifying agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifying agent may enhance the grain-to-grain contact between the individual particulates within the formation (be they proppant particulates, formation fines, or other particulates), helping bring about the consolidation of the particulates into a cohesive, flexible, and permeable mass. Solvents suitable for use with the aqueous tackifying agents of the present invention include any solvent that is compatible with the aqueous tackifying agent and achieves the desired viscosity effect. Examples of solvents suitable for use in the present invention include, but are not limited to, fresh water, salt water, brine, and sea water. It is within the ability of one skilled in the art, with the benefit of this disclosure, to determine whether a solvent is needed to achieve a viscosity suitable to the subterranean conditions and, if so, how much.

Suitable aqueous tackifying agents include any polymer that can bind, coagulate, or flocculate a particulate. Also, polymers that function as pressure sensitive adhesives may be suitable. Examples of aqueous tackifying agents suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly(butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers, derivatives thereof, and combinations thereof. The term "derivative" as used herein refers to any compound that is made from one of the listed compounds, for example, by replacing one atom in the base compound with another atom or group of atoms. Methods of determining suitable aqueous tackifying agents and additional disclosure on aqueous tackifying agents can be found in Published U.S. Patent Application Number 2005-0277554 and U.S. Pat. No. 7,131,491, the relevant disclosures of which are hereby incorporated by reference.

Some suitable tackifying agents are described in U.S. Pat. No. 5,249,627 by Harms, et al., the relevant disclosure of which is incorporated by reference. Harms discloses aqueous tackifying agents that comprise at least one member selected from the group consisting of benzyl coco di-(hydroxyethyl) quaternary amine, p-T-amyl-phenol condensed with formaldehyde, and a copolymer comprising from about 80% to about 100% $C_{1-30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophilic monomers may be any monomer that will provide polar oxygen-containing or nitrogen-containing groups. Suitable hydrophilic monomers include dialkyl amino alkyl(meth)acrylates and their quaternary addition and acid salts, acrylamide, N-(dialkyl amino alkyl) acrylamide, methacrylamides and their quaternary addition and acid salts, hydroxy alkyl(meth)acrylates, unsaturated carboxylic acids such as methacrylic acid or preferably acrylic acid, hydroxyethyl acrylate, acrylamide, and the like. These copolymers can be made by any suitable emulsion polymerization technique. Methods of producing these copolymers are disclosed, for example, in U.S. Pat. No. 4,670,501, the relevant disclosure of which is incorporated herein by reference.

C. Silyl-Modified Polyamide Compounds

Silyl-modified polyamide compounds suitable for use as an adhesive substance in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

Solvents suitable for use with the silyl-modified polyamide compounds of the present invention include any solvent that is compatible with the silyl-modified polyamide compounds and achieves the desired viscosity effect. The solvents that can be used in the present invention preferably include those having high flash points (most preferably above about 125° F.). Examples of solvents suitable for use in the present invention include, but are not limited to, ethers, alcohols, carbonates, acetates, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, and fatty acid methyl esters. It is within the ability of one skilled in the art, with the benefit of this disclosure to determine whether a solvent is needed to achieve a viscosity suitable to the subterranean conditions and, if so, how much.

III. Suitable Particulates and Carrier Fluids

A. Suitable Particulates

A wide variety of particulate materials may be used in accordance with the present invention, including, but not limited to, sand, bauxite, ceramic materials, glass materials, polymer materials, tetrafluoroethylene materials (more commonly known by its trade name, "TEFLON™," and available from DuPont), nut shell materials, seed shell materials, fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass; or mixtures thereof. The particulate material used may have a particle size in the range of from about 2 to about 400 mesh, U.S. Sieve Series. Preferably, the particulate material is graded sand having a particle size in the range of from about 10 to about 70 mesh, U.S. Sieve Series. Preferred sand particle size distribution ranges are one or more of 10-20 mesh, 20-40 mesh, 40-60 mesh or 50-70 mesh, depending on the particle size and distribution of the formation particulates to be screened out by the particulate materials. It should be understood that the term "particulate," as used in this disclosure, includes all known shapes of materials including substantially spherical materials, fibrous materials, polygonal materials (such as cubic materials) and mixtures thereof. It should also be understood that the term "proppant," as used in this disclosure, includes all known shapes of materials including substantially spherical materials, fibrous materials, polygonal materials (such as cubic materials) and mixtures thereof.

B. Suitable Carrier Fluids

Generally, any carrier fluid suitable for a subterranean operation may be used in accordance with the methods of the present invention, including aqueous gels, viscoelastic surfactant gels, foamed gels and emulsions. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In certain embodiments of the present invention, the carrier fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, carrier fluid to, among other things reduces fluid loss and allows the carrier fluid to transport significant quantities of suspended particulates. The water used to form the carrier fluid may be fresh water, salt water, brine, sea water, or any other aqueous liquid that does not adversely react with the other components. The density of the water can be increased to provide additional particle transport and suspension in the present invention.

A variety of gelling agents may be used, including hydratable polymers that contain one or more functional groups such as hydroxyl, carboxyl, sulfate, sulfonate, amino, or amide groups. Suitable gelling agents typically comprise polymers, synthetic polymers, or a combination thereof. A variety of gelling agents may be used in conjunction with the methods of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In some embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver et al., the relevant disclosure of which is incorporated herein by reference. Suitable gelling agents that may be used in conjunction with the methods of the present invention may be present in the carrier fluid in an amount in the range of from about 0.01% to about 5% by weight of the water therein. In some embodiments, the gelling agents may be present in the carrier fluid in an amount in the range of from about 0.01% to about 2% by weight of the water therein.

Crosslinking agents may be used to crosslink gelling agent molecules to form crosslinked gelling agents. Crosslinkers typically comprise at least one metal ion that is capable of crosslinking molecules. Examples of suitable crosslinkers include, but are not limited to, zirconium compounds (such as, for example, zirconium lactate, zirconium lactate triethanolamine, zirconium acetylacetonate, zirconium citrate, and zirconium diisopropylamine lactate); titanium compounds (such as, for example, titanium lactate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan, Okla. Suitable crosslinkers that may be used in conjunction with the methods of the present invention may be present in the carrier fluid in an amount sufficient to provide, among other things, the desired degree of crosslinking between gelling agent molecules. In some embodiments of the present invention, the crosslinkers may be present in the carrier fluid in an amount in the range from about 0.001% to about 10% by weight of the water therein. In other embodiments of the present invention, the crosslinkers may be present in the carrier fluid in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked carrier fluids may also include internal delayed gel breakers such as enzyme, oxidizing, acid buffer, or temperature-activated gel breakers. The gel breakers cause the viscous carrier fluids to revert to thin fluids that can be produced back to the surface after they have been used to place particulates in subterranean fractures. The gel breaker used is typically present in the carrier fluid in an amount in the range of from about 0.05% to about 10% by weight of the gelling agent. The carrier fluids may also include one or more of a variety of well-known additives, such as gel stabilizers, fluid loss control additives, clay stabilizers, bactericides, and the like.

As discussed above, in accordance with the methods of the present invention, particulates are at least partially coated with a tackifying compound and a resin. The coated particulates may then be suspended in a carrier fluid (possibly with additional uncoated particulates), and this carrier fluid comprising coated particulates may be placed into a subterranean formation. The particulates may be suspended in the carrier fluid by any suitable method as recognized by one skilled in the art with the benefit of this disclosure, including using a fracturing blender. In certain embodiments, a liquid composition comprising a tackifying compound and a resin may be coated onto at least a portion of the particulates. In other embodiments, the particulates may first be coated with a tackifying compound and then coated with a resin. In other embodiments, the particulates may be coated with a tackifying compound and then suspended into a carrier fluid comprising a resin.

In certain embodiments, the particulates may be coated with the curable composition in an amount of from about 0.1% to about 25% by weight of the particulates. In other embodiments, the particulates may be coated with the curable composition in an amount of from about 1% to about 5%. In certain embodiments, the particulates may be coated with the tackifying compound in an amount from about 0.1% to about 25% by weight of the particulates. In other embodiments, the particulates may be coated with the tackifying compound in an amount from about 1% to about 5%. The ranges given herein are applicable both to embodiments wherein the resin or tackifying compound is coated directly onto particulates and to embodiments wherein the resin is placed into a carrier fluid and then contacts and coats the particulate.

In one embodiment, a plurality of particulates may be coated with a liquid composition comprising a tackifying compound and a resin to form coated particulates. The coated particulates may then be suspended in a carrier fluid before being placed into a subterranean formation. In some preferred embodiments the particulates are coated with the liquid composition (comprising both tackifying compound and resin) in an amount from about 0.1-25% by weight of the particulates; preferably from about 1-15%; more preferably from about 2-10%. One skilled in the art will recognize that the liquid composition may comprise nearly any ratio of resin to tackifier depending up, among other things, the level of consolidation desired, the level of final "tackiness" desired, and the degree of curing of the resin desired to be attributed to the tackifier. In some preferred embodiments the ratio of resin to tackifier ranges from about 1:0.5 to about 1:1.5; preferably 1:1. In some preferred embodiments, the coating of the liquid composition onto the particulates is performed on-the-fly; that is, the particulates are coated at the well site and then placed directly into a carrier fluid to be suspended and sent down hole.

In another embodiment, a plurality of particulates may be coated with a tackifying compound to form coated particulates and then those tackifying compound-coated particulates are further at least partially coated with a resin before being suspended in a carrier fluid or coated with a resin while being suspended in a carrier fluid. The carrier fluid may then be placed into a subterranean formation. In some preferred embodiments the particulates are coated with the tackifying compound in an amount from about 0.1-25% by weight of the particulates; preferably from about 1-15%; more preferably from about 2-10%. Similarly, in some preferred embodiments the particulates are coated with the resin in an amount from about 0.1-25% by weight of the particulates (based on the weight of the particulates before they are coated with the tackifying compound); preferably from about 1-15%; more preferably from about 2-10%. One skilled in the art will recognize that nearly any ratio of resin to tackifying compound may be used depending up, among other things, the level of consolidation desired, the level of final "tackiness" desired, and the degree of curing of the resin desired to be attributed to the tackifier. In some preferred embodiments the ratio of resin to tackifier ranges from about 1:0.5 to about 1:1.5; preferably 1:1. Again, in some preferred embodiments, the coating of the tackifying compound, the resin, or both may be preformed on-the-fly.

In still another embodiment of the present invention, a plurality of particulates may be coated with a tackifying compound to form coated particulates and then those tackifying compound-coated particulates suspended in a carrier fluid wherein the carrier fluid comprises a resin. The carrier fluid may then be placed into a subterranean formation. In some preferred embodiments the particulates are coated with the tackifying compound in an amount from about 0.1-25% by weight of the particulates; preferably from about 1-15%; more preferably from about 2-10%. The resin is preferably included in the carrier fluid in an amount from about 0.1-25% by weight of the particulates (based on the weight of the particulates before they are coated with the tackifying compound); preferably from about 1-15%; more preferably from about 2-10%. One skilled in the art will recognize that nearly any ratio of resin to tackifying compound may be used depending up, among other things, the level of consolidation desired, the level of final "tackiness" desired, and the degree of curing of the resin desired to be attributed to the tackifier. In some preferred embodiments the ratio of resin to tackifier ranges from about 1:0.5 to about 1:1.5; preferably 1:1. Again, in some preferred embodiments, the coating of the tackifying compound may be preformed on-the-fly.

Once the coated particulates have been suspended in a carrier fluid, they may be used as needed in a portion of a subterranean formation serviced by a well bore. It is to be understood that the term "subterranean formation" encompasses both areas below exposed earth and areas below earth covered by water, such as ocean water or fresh water. The carrier fluids comprising the coated particulates may be used in any suitable well treatment in which it is desirable to control particulates and or to reduce the closure of a fracture once fracturing pressure is released. In some embodiments, the coated particulates of the present invention may adhere to unconsolidated particulates within the subterranean formation.

In any of the three embodiments described above, an optional step may be preformed before the carrier fluid is placed into the subterranean formation. That is, optionally, particulates coated with only a tackifying compound may be suspended in a pre-treatment fluid and then be placed into the subterranean formation before the placement of the carrier fluid (comprising some combination of tackifying compound, resin, and particulates as described above). In these optional methods, the tackifying compound is placed into the formation at a location farther from the wellbore than the particulates in the carrier fluid so that they can act as an additional barrier to fines migration. Similarly to the methods described above, in some preferred embodiments, the coating of the tackifying compound that is suspended in the pre-treatment fluid may be preformed on-the-fly.

In some embodiments, the methods of the present invention may be used in conjunction with the stages of a fracturing operation, a gravel packing operation, or a frac-packing operation wherein particulates are desired. One example of such a method comprises: providing a carrier fluid used during the proppant placing stage of a fracturing operation wherein the carrier fluid comprises coated particulates of the present invention; placing the carrier fluid into a desired location within the subterranean formation, such as within a newly created fracture; and allowing the coated particulate to consolidate particulates within the portion of the subterranean formation and/or allowing the coated particulate to adhere to a surface and/or unconsolidated particulates within the portion of the subterranean formation.

One example of a gravel pack method of the present invention comprises: providing a gravel pack fluid that comprises gravel, a brine, optionally a gelling agent, and a coated particulate; contacting the portion of the subterranean formation with the gravel pack fluid so as to place a gravel pack in or near a portion of the subterranean formation; and allowing the coated particulates to stabilize particulates within the subterranean formation. The gravel pack fluids used in these embodiments may be any suitable gravel pack fluid, and it may comprise those things usually found in gravel pack fluids including, but not limited to, an aqueous base fluid, gravel particulates, gelling agents, surfactants, breakers, buffers, a gas phase (if the fluid is foamed or commingled), and the like.

In some other embodiments of the present invention, after a fracturing treatment or a gravel pack treatment has been performed, a carrier fluid comprising coated particulates of the present invention may be introduced into an unconsolidated zone of a subterranean formation to stabilize particulates within the zone. The carrier fluids comprising coated particulates may disperse any loose fines within a proppant pack in a fracture, move any fines away from the fracture (or near well bore), stabilize gravel particulates around a screen, stabilize a screen failure, or lock the fines in the formation.

To facilitate a better understanding of the present invention, the following examples of certain aspects of some embodiments are given. In no way should the following examples be read to limit, or define, the scope of the invention. To facilitate a better understanding of the present invention, the following examples of certain aspects of some embodiments are given. In no way should the following examples be read to limit, or define, the entire scope of the invention.

EXAMPLE 1

Two hundred grams of 20/40-mesh Brady sand were first dry coated with 2 mL of a tackifying compound (a dimer acid polyamide with additional amine functionality). The coated sand was then added to 250 mL of tap water and stirred well with an overhead stirrer to form a slurry. It was observed that the coated sand was quite tacky. A water-based emulsion (water external phase) of modified bisphenol A-Epichlorohydrin based epoxy resin in an amount of 4 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to remain tacky with some consolidation. Consolidated cores were cut into size for unconfined compressive strength measurements. An average UCS of 8 psi was obtained.

EXAMPLE 2

Two hundred grams of 20/40-mesh Brady sand were first dry coated with 2 mL of a tackifying compound (a dimer acid polyamide with additional amine functionality). The coated sand was then added to 250 mL of tap water and stirred well with an overhead stirrer to form a slurry. It was observed that the coated sand was quite tacky. A water-based emulsion (water external phase) of modified bisphenol A-Epichlorohydrin based epoxy resin in an amount of 8 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to remain tacky with some consolidation. Consolidated cores were cut into size for unconfined compressive strength measurements. An average UCS of 10 psi was obtained.

EXAMPLE 3

Two hundred grams of 20/40-mesh Brady sand were first dry coated with 2 mL of a tackifying compound (a dimer acid polyamide with additional amine functionality). The coated sand was then added to 250 mL of 30 lbs/Mgal linear borate fracturing fluid (SILVERSTIM$^{SM}$ LT, available from Halliburton Energy Services in Duncan, Okla.) and stirred well with an overhead stirrer to form a slurry. It was observed that the coated sand was quite tacky. A water-based emulsion (water external phase) of modified bisphenol A-Epichlorohydrin based epoxy resin in an amount of 4 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be tacky and firm, yet bendable (flexible), indicating the pack possessed some consolidation.

EXAMPLE 4

Two hundred grams of 20/40-mesh Brady sand were first dry coated with 2 mL of a tackifying compound (a dimer acid polyamide with additional amine functionality). The coated sand was then added to 250 mL of 30 lbs/Mgal linear borate fracturing fluid (SILVERSTIM$^{SM}$ LT) and stirred well with an overhead stirrer to form a slurry. It was observed that the coated sand was quite tacky. A water-based emulsion (water external phase) of modified bisphenol A-Epichlorohydrin based epoxy resin in an amount of 8 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be tacky and firm, yet bendable (flexible), indicating the pack possesses some consolidation, similar to the sand pack obtained in Example 3.

EXAMPLE 5

Two hundred grams of 20/40-mesh Brady sand were first dry coated with 4 mL of tackifying compound (SAND-WEDGE® NT, commercially available from Halliburton Energy Services in Duncan, Okla.). The coated sand was then added to 250 mL of tap water and stirred well with an overhead stirrer to form a slurry. It was observed that the coated sand was quite tacky. A solvent-based epoxy resin EXPEDITE® 350A (commercially available from Halliburton Energy Services, Duncan, Okla.) in an amount of 0.2 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be tacky and firm, yet bendable (flexible), indicating the pack possesses some consolidation.

EXAMPLE 6

Two hundred grams of 20/40-mesh Brady sand were first dry coated with 4 mL of a tackifying compound (a dimer acid polyamide with additional amine functionality). The coated sand was then added to 250 mL of tap water and stirred well with an overhead stirrer to form a slurry. It was observed that the coated sand was quite tacky. A solvent-based epoxy resin EXPEDITE® 350A in an amount of 0.2 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be tacky and firm, yet bendable (flexible), indicating the pack possesses some consolidation, similar to the sand pack obtained in Example 5.

EXAMPLE 7

Two hundred grams of 20/40-mesh Brady sand were first dry coated with 3 mL of a tackifying compound (a dimer acid polyamide with additional amine functionality). The coated sand was then added to 250 mL of 3% KCl brine and stirred well with an overhead stirrer to form a slurry. It was observed that the coated sand was quite tacky. A solvent-based epoxy resin EXPEDITE® 350A in an amount of 0.2 mL, was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be firm and still tacky with some consolidation. Consolidated cores were cut into size for unconfined compressive strength measurements. The sand pack was observed to be tacky. An average UCS of 6 psi was obtained.

EXAMPLE 8

Two hundred grams of 20/40-mesh Brady sand were first dry coated with 3 mL of a tackifying compound (a dimer acid polyamide with additional amine functionality). The coated sand was then added to 250 mL of 3% KCl brine and stirred well with an overhead stirrer to form a slurry. It was observed that the coated sand was quite tacky. A solvent-based epoxy resin EXPEDITE® 350A in an amount of 0.2 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be firm and still tacky with some consolidation. Consolidated cores were cut into size for unconfined compressive strength measurements. The sand pack was observed to be tacky. An average UCS of 70 psi was obtained.

EXAMPLE 9

Two hundred grams of 20/40-mesh Brady sand were first dry coated with 3 mL of a tackifying compound (a dimer acid polyamide with additional amine functionality). The coated sand was then added to 250 mL of 30 lbs/Mgal linear borate fracturing fluid (SILVERSTIM$^{SM}$ LT) and stirred well with an overhead stirrer to form a slurry. It was observed that the coated sand was quite tacky. A solvent-based epoxy resin EXPEDITE® 350A in an amount of 0.2 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be firm and still tacky with some consolidation. Consolidated cores were cut into size for unconfined compressive strength measurements. The sand pack was observed to be tacky. An average UCS of 3 psi was obtained.

EXAMPLE 10

Two hundred grams of 20/40-mesh Brady sand were first dry coated with 3 mL of a tackifying compound (a dimer acid polyamide with additional amine functionality). The coated sand was then added to 250 mL of 30 lbs/gal linear borate fracturing fluid (SILVERSTIM$^{SM}$ LT) and stirred well with an overhead stirrer to form a slurry. It was observed that the coated sand was quite tacky. It was observed that the coated sand was quite tacky. A solvent-based epoxy resin EXPEDITE® 350A in an amount of 0.2 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be firm and still tacky with some consolidation. Consolidated cores were cut into size for unconfined compressive strength measurements. The sand pack was observed to be tacky. An average UCS of 1 psi was obtained.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
    providing first particulates and a liquid composition comprising a tackifying compound and a resin, wherein the ratio of the resin to the tackifying compound is about 1:0.5 to about 1:1;
    coating the first particulates with the liquid composition to form coated particulates;
    then suspending the coated particulates in a carrier fluid; and
    placing the carrier fluid comprising first coated particulates into a portion of a subterranean formation.

2. The method of claim 1 comprising, before the step of placing the carrier fluid:
    placing particulates coated with a tackifying compound into substantially the same portion of the subterranean formation as the carrier fluid comprising first coated particulates will be placed.

3. The method of claim 1 wherein the tackifying compound is a material comprising at least one selected from the group consisting of non-aqueous tackifying agents, aqueous tackifying agents, silyl-modified polyamides, and mixtures thereof.

4. The method of claim 1 wherein the tackifying compound further comprises a solvent.

5. The method of claim 1 wherein the tackifying compound is present in the liquid composition in an amount from about 0.1% to about 25% by weight of the particulates.

6. The method of claim 1 wherein the resin is a material comprising at least one selected from the group consisting of two component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins, hybrids of polyester resins, copolymers of polyester resins, polyurethane resins, hybrids of polyurethane resins, copolymers of polyurethane resins, acrylate resins, water-based resins, HT epoxy-based resins, and mixtures thereof.

7. The method of claim 1 wherein the resin further comprises a solvent.

8. The method of claim 1 wherein the resin is present in the liquid composition in an amount from about 0.1% to about 25% by weight of the particulates.

9. A method comprising:
providing particulates, a tackifying compound, and a resin;
coating the particulates with the tackifying compound to form tackifying compound-coated particulates;
coating the tackifying compound-coated particulates with the resin to form twice-coated particulates, wherein the ratio of the resin to the tackifying compound is about 1:0.5 to about 1:1;
then suspending the twice-coated particulates in a carrier fluid; and
placing the carrier fluid into a portion of a subterranean formation.

10. The method of claim 9 comprising, before the step of placing the carrier fluid:
placing particulates coated with a tackifying compound into substantially the same portion of the subterranean formation as the carrier fluid comprising the twice-coated particulates will be placed.

11. The method of claim 9 wherein the tackifying compound is a material comprising at least one selected from the group consisting of non-aqueous tackifying agents, aqueous tackifying agents, silyl-modified polyamides, and mixtures thereof.

12. The method of claim 9 wherein the tackifying compound further comprises a solvent.

13. The method of claim 9 wherein the tackifying compound is present in the liquid composition in an amount from about 0.1% to about 25% by weight of the particulates.

14. The method of claim 9 wherein the resin is a material comprising at least one selected from the group consisting of two component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins, hybrids of polyester resins, copolymers of polyester resins, polyurethane resins, hybrids of polyurethane resins, copolymers of polyurethane resins, acrylate resins, water-based resins, HT epoxy-based resins, and mixtures thereof.

15. The method of claim 9 wherein the resin further comprises a solvent.

16. The method of claim 9 wherein the resin is present in the liquid composition in an amount from about 0.1% to about 25% by weight of the particulates.

\* \* \* \* \*